Patented Aug. 31, 1926.

1,597,791

UNITED STATES PATENT OFFICE.

ERIC BERKELEY HIGGINS, OF LONDON, ENGLAND.

AZO DYESTUFFS AND INTERMEDIATES AND PROCESS FOR MAKING SAME.

No Drawing. Application filed November 29, 1924, Serial No. 752,941, and in Great Britain December 19, 1923.

This invention relates to the production of azo dyestuffs and incidentally to the manufacture of intermediate products from which such dyestuffs are formed. In the production of azo dyestuffs it is known that colours produced from arylamides of ortho carboxy-substituted phenols and naphthols, particularly those characterized by containing the group:—

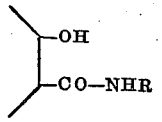

possess advantages in brightness of colour, fastness to washing, to light, and to diluted chlorine, over those produced from simple phenols or naphthols. In the above graphic formula, "R" is a simple or substituted benzene, or naththalene group.

Such arylamides of phenol or naphthol orthocarboxylic acids possess the disadvantage that their alkaline solutions oxidize rapidly, and when used to produce azo colours on the fibre, produce colours which are not fast to rubbing. To overcome these difficulties, various additions to the dye bath have been suggested, of which formaldehyde is probably the best. The use of formaldehyde, however, involves the disadvantage that the primary reaction product between, or mixture of the formaldehyde and substituted phenol or naphthol which is itself an excellent material for the production of azo colours, undergoes molecular rearrangement on standing, so that the phenol or naphthol solutions made up in this way deteriorate, and in the course of a few days become useless.

In order to overcome the lack of fastness to rubbing when the azo colour is applied to the fibre, other additions to the dye bath have been suggested, as for example, Turkey red oil, increasing the penetration of the solution, or Turkey red oil in conjunction with glue or gelatine, which latter by reaction under the influence of the formaldehyde will further increase the fastness of the produced colour to rubbing.

It has now been found that if in arylamides of ortho carboxy-substituted naphthols or phenols of the type:—

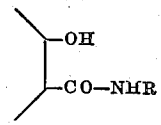

(where "R" is, as before, a simple or substituted benzene, or naphthalene group), the labile hydrogen of the group OHCO—NHR is replaced by the residue of a quaternary ammonium base, preferably of the aromatic heterocyclic series, products are obtained in which the disadvantage of the known substituted bodies previously employed, are eliminated, or reduced to a mimimum. Such new bodies may and probably do have the general formula:—

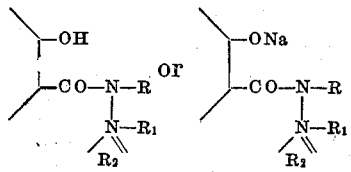

In this formula, "R" is a simple or substituted benzene or naphthalene radicle; $R_1$ is a similar radicle not necessarily identical with R, or it may be hydrogen; and $R_2$ is a residue of a heterocyclic aromatic hydrocarbon or substituted hydrocarbon. The group OH.CO—NHR can undergo several tautomeric changes as shown by the following examples:—

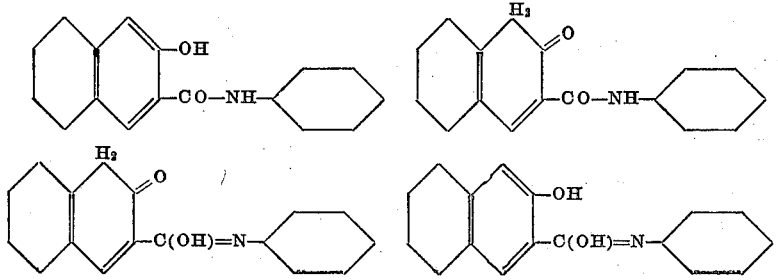

Thus at least two distinct mono-acetyl compounds may be produced by varying the conditions. As a consequence of this, it has not been found possible to determine accurately the constitution of this group.

*Example 1.*

One molecular weight of the di-potassium or di-sodium salt of the arylide, such as for example the anilide of 2.3 hydroxynaphthoic acid is suspended or dissolved in a suitable solvent (for example 317 grammes of the di-sodium salt is dissolved in 450 c. c. of alcohol) and brought up to water bath temperature under reflux. One molecular weight of pyridine methyl iodide is added to the warm solution little by little. For convenience the pyridine methyl iodide may be brought into solution or mixed into a paste with a suitable solvent, for example alcohol, and introduced in this form. The reaction is very rapid and is completed almost as rapidly as the constituents are mixed, but it is desirable to warm the mixture for from 15 to 20 minutes at water bath temperature. The reaction mixture is poured into a large excess of cold water whereupon the new product—the methyl pyridonium compound of the arylide of 2.3 hydroxynaphthoic acid—separates out as a bright yellow precipitate which may be separated by filtration and washed with a little cold water. Although for similar reasons to those mentioned above, the constitution of this compound is not certain, it is believed that it may be represented by the following formula:—

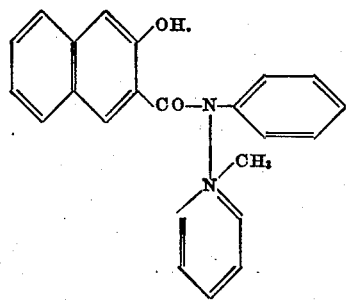

This crude product has an indefinite melting point round about 205 degrees centigrade, but on recrystallization from alcohol melts sharply at 230 degrees centigrade. It is insoluble in ether and cold water, but is very soluble in hot acetone, alcohol and glacial acetic acid and extremely soluble in pyridine even in the cold. Aqueous solution of alkali dissolves it and it may be applied to the fibre in dyeing either from such solutions or from solutions in pyridine.

It is obviously impossible to specify every equivalent body which may be used instead of those given in this example. However, clearly the pyridine methyl iodide may be replaced by any other quaternary base halide, for example, pyridine ethyl iodide, pyridine benzyl iodide, pyridine isobutyl chloride and so forth and, of course, other arylides of 2.3 hydroxynaphthoic acid might be employed instead of the anilide, for example, alpha naphthyl amide of 2.3 hydroxynaphthoic acid.

*Example 2.*

The o-acetyl compound of the arylide, for example of the anilide of 2.3 hydroxynaphthoic acid, is treated with excess of pyridine and the acetyl derivative of the pyridonium compound is easily isolated. For example 13 grammes of anilide of 2.3 hydroxynaphthoic acid is heated for two hours under reflux to 60 degrees centigrade with 45 grammes of acetyl chloride. The excess of acetyl chloride is distilled from the acetyl derivative thus produced at the temperature of a water bath with or without the use of reduced pressure. While still at the water bath temperature, 40 grammes of pyridine are added in small quantities at a time and while stirring and the whole mass is finally brought into solution by heating for a quarter of an hour at the boiling point of pyridine. The mass is poured into water and a bright orange precipitate is obtained which is the crude pyridonium compound. The yield is practically quantitative calculating upon a mean molecular weight of 384. The substance when recrystallized from alcohol forms bright yellow crystals having a melting point of 237 degrees centigrade. They are insoluble in cold water, but dissolve in boiling toluene and glacial acetic acid and acetone. The body is extremely soluble in pyridine and in aqueous pyridine solutions. The molecular weight determined by the elevation of the boiling point of acetone is 382 and by combustion it is found to contain 74.87 per cent of carbon and 5.01 per cent of hydrogen. (The theoretical figures required for a combination between one molecule of anilide of acetyl hydroxynaphthoic acid and one molecule of pyridine are mean molecular weight 384, carbon content 75 per cent and hydrogen content 5.2 per cent.)

Coupled with di-azotized metanitropara-toluidine it yields a bright red insoluble azo dyestuff of slightly more brilliant shade than that obtained from the original anilide alone and this dyestuff has a melting point of 295 degrees centigrade as compared with 284 degrees centigrade for the anilide compound. It appears probable that the constitution of the dyestuff may be represented as follows:—

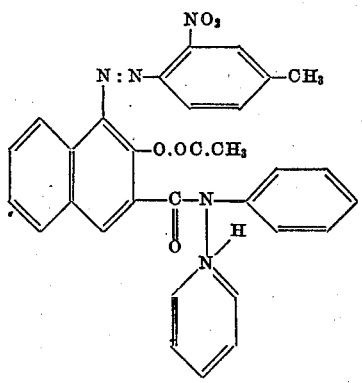

Other groups than the acetyl group may be used to protect the hydroxyl group, such as the benzoyl group, for example that is to say, practically any acid chloride may be used.

*Example 3.*

One molecular weight of arylide, again say the anilide of 2.3 hydroxynaphthoic acid is ground together with one molecule of pyridine; combination immediately takes place and a body is produced which is probably of the identical constitution of those described above, or again one molecular weight of the anilide of 2.3 hydroxynaphthoic acid is mixed with one molecular weight of pyridine hydrochloride and the mixture is treated with one molecular weight of caustic soda, the whole being ground together solid or in the presence of water and a similar body is produced. It is found to be extremely difficult to isolate these products without decomposition but the substance can be used in the form in which it is obtained by the above methods.

All these bodies have the property that weight for weight and under the same conditions they will give a more intense colour than the untreated arylide. They are all very soluble in aqueous pyridine solutions and may be applied to the fibre in dyeing in such solutions without using caustic soda, although they may be dyed in the presence of caustic soda, since their sodio compounds are soluble in water. They are particularly suitable for combination with stabilized diazo compounds, such as nitrosamines, for the production of so-called rapid printing colours. For example, if a mixture of equal weights of the bodies obtained as described with reference to Examples 1, 2 and 3 above with the equivalent quantity of nitrosamine of metanitroparatoluidine for example be printed upon calico in comparison with a similar mixture from the arylide and the print be subjected to moist heat, as for example in a rapid ager, the new products will be found to give more intense shades. Finally it is not necessary for the printing pastes to be rendered strongly alkaline as with arylides.

Baths made from these bodies used in the production of azo dyestuffs can be preserved for long periods and made up to strength as they are progressively weakened by the dyeing process.

On account of the very high penetrative power possessed by these bodies per se in solution, the addition of formaldehyde or Turkey red oil, or similar products to the dye bath is rendered unnecessary, and the colours produced upon the fibre possess very great fastness to rubbing.

By combination of the new products with diazotized amines a series of azo colours can be produced, the shade of these azo colours being more profoundly influenced in general by variation in the diazo body selected than by the constitution of the substituted radicles $R$, $R_1$, $R_2$ in the parent body, though usually for each special colour to be produced better effects are produced by one selection of the possible radicles $R$, $R_1$, $R_2$, than by another.

For example, combination of the new body:—

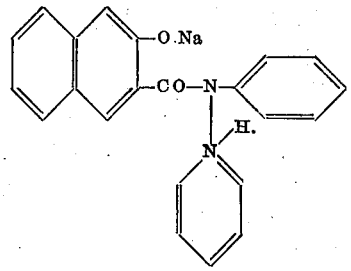

with diazotized metanitroparatoluidine produces a red similar to "Turkey red", while the use of tetrazotized ortho dianisidine will result in a blue of indigo type. Mixed amines may be used; thus a mixture of 50 per cent tetrazotized benzidine and 50 per cent tetrazotized ortho dianisidine produces a warm navy blue, and so forth. This navy blue azo dyestuff may have the following constitution although as already mentioned, this is somewhat uncertain:—

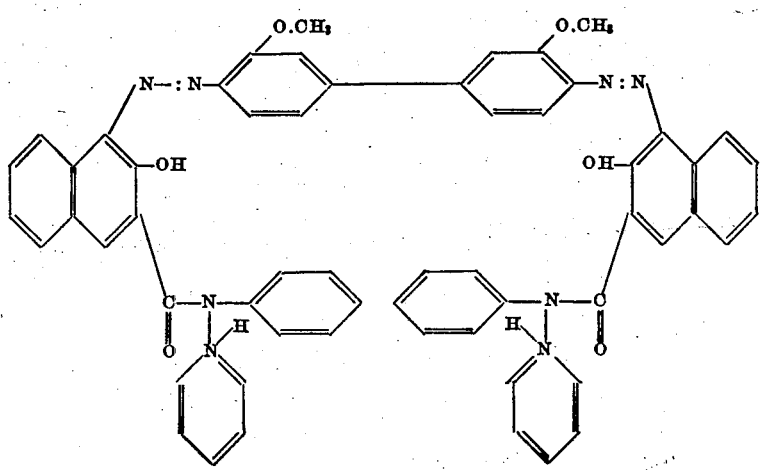

If, on the other hand, the new body:—

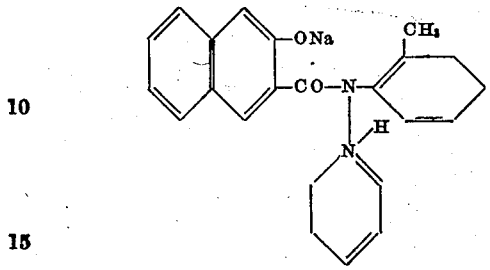

where "R" is modified by the introduction of an ortho $CH_3$ group, be combined with diazotized metanitroparatoluidine, the red produced has a bluish nuance.

Having thus described my invention what I claim as new and desire to secure by Letters Patent is:—

1. The process for making dye intermediates which consists in treating an arylamide of an ortho-carboxy-substituted naphthol or phenol by a substance which causes the labile hydrogen of the group OH.CO—NHR to be replaced by the residue of a quaternary ammonium base.

2. The process for making dye intermediates which consists in treating an arylamide of an ortho-carboxy-substituted naphthol or phenol by a substance which causes the labile hydrogen of the group OH.CO—NHR to be replaced by the residue of a quaternary ammonium base of the aromatic heterocyclic series.

3. The process for making dye intermediates which consists in treating a substance containing an arylamide of an ortho-carboxy-substituted naphthol or phenol by a substance which causes the labile hydrogen of the group OH.CO—NHR to be replaced by the residue of a quaternary ammonium base.

4. The process for making dye intermediates which consists in replacing the labile hydrogen of anilide of 2.3 hydroxynaphthoic acid by a substance containing pyridine.

5. The process for making dye intermediates which consists in replacing the labile hydrogen of anilide of 2.3 hydroxynaphthoic acid by pyridine.

6. The process for making dye intermediates which consists in acting upon the o-acyl compound of an arylide of 2.3 hydroxynaphthoic acid by excess of pyridine.

7. The process for the manufacture of an acyl pyridonium compound of an arylide of 2.3 hydroxynaphthoic acid which consists in treating the o-acetyl compound of anilide of 2.3 hydroxynaphthoic acid with excess of pyridine.

8. The process for the manufacture of an acyl pyridonium compound of an arylide of 2.3 hydroxynaphthoic acid which consists in heating an anilide of 2.3 hydoxynaphthoic acid with acetyl chloride, distilling the excess of the acetyl chloride over a water bath gradually adding excess of pyridine while stirring, heating at the boiling point of pyridine to bring the mass into solution and pouring the solution into water to separate the product.

9. A dye intermediate consisting of an arylamide of an ortho-carboxy-substituted naphthol or phenol having the labile hydrogen of the group OH.CO—NHR replaced by the residue of a quaternary ammonium base.

10. A dye intermediate consisting of an arylamide of an ortho-carboxy-substituted naphthol or phenol having the labile hydrogen of the group OH.CO—NHR replaced by pyridine.

11. A dye intermediate consisting of the acetyl pyridonium compound of an arylide of 2.3 hydroxynaphthoic acid.

12. A dye intermediate consisting of anilide of 2.3 hydroxynaphthoic acid, the labile hydrogen of which is replaced by pyridine.

In witness whereof, I hereunto subscribe my name this 20th day of November, A. D. 1924.

ERIC BERKELEY HIGGINS.